United States Patent
Neuman (10) Patent No.: US 7,363,440 B1
(45) Date of Patent: Apr. 22, 2008

(54) SYSTEM AND METHOD FOR DYNAMICALLY ACCESSING MEMORY WHILE UNDER NORMAL FUNCTIONAL OPERATING CONDITIONS

(75) Inventor: Paul S. Neuman, Shoreview, MN (US)

(73) Assignee: Unisys Corporation, Blue Bell, PA (US)

(*) Notice: Subject to any disclaimer, the term of this patent is extended or adjusted under 35 U.S.C. 154(b) by 340 days.

(21) Appl. No.: 11/026,843

(22) Filed: Dec. 30, 2004

(51) Int. Cl.
G06F 12/02 (2006.01)
G06F 13/16 (2006.01)
G06F 13/22 (2006.01)

(52) U.S. Cl. .................. 711/154; 711/167; 710/4; 710/29; 710/33; 710/39; 710/61

(58) Field of Classification Search .......... 710/3, 710/4, 29, 33, 36, 39, 58, 61; 711/154, 167
See application file for complete search history.

(56) References Cited

U.S. PATENT DOCUMENTS 7,076,767 B1 * 7/2006 Williams .................. 717/127

* cited by examiner

*Primary Examiner*—Jack Lane
(74) *Attorney, Agent, or Firm*—Charles A. Johnson; Robert Marley; Hollingsworth & Funk LLC (57) ABSTRACT

A system and method for dynamically accessing memory under normal operating conditions without interrupting computer system clocks that are otherwise executing. At least a memory access mode and a memory address(es) are scanned into a control scan chain from a maintenance system. When the scan is complete, the information is collectively transferred to an access register bank. Based on the control signals, a selection multiplexer selects the information from the control scan chain provided by the maintenance system as opposed to standard signals generated by the computer system. Memory control input signals are generated in response to a clock trigger signal, and the read or write data transfer is initiated.

27 Claims, 8 Drawing Sheets

SYSTEM AND METHOD FOR DYNAMICALLY ACCESSING MEMORY WHILE UNDER NORMAL FUNCTIONAL OPERATING CONDITIONS

FIELD OF THE INVENTION

The present invention relates in general to memory systems, and more particularly, to dynamic accessing of memory while under normal operating conditions.

BACKGROUND OF THE INVENTION

Current large-scale computing systems include computer system components, such as multiple processors and memory banks, to perform various computer functions and applications. Data processing on such computing systems generally requires a large quantity of data transfers between the multiple processors and memory banks. System clocks are used to synchronize the data transfers between the multiple processors and memory banks. Due to data congestion and complexities associated with the system clocks, the multiple processors, and many memory banks, significant effort is made to manage such computing systems.

Many such computing systems often include a maintenance processor to maintain the system operations and functional integrity of computer systems components, such as the multiple processors and memory banks. A maintenance processor generally implements maintenance and/or utility functions for testing system operations and computer system components for functional integrity. A maintenance processor can check or reset various system operations such as date, time, and alarm status information. System configuration and network configuration parameters may be modified or tested with a maintenance processor.

Computer system components can also be tested and debugged with a maintenance processor. For example, a maintenance processor can test a memory bank by writing test data to the memory bank, reading the test data from the memory bank, and then comparing the written test data to the read test data. If the written test data matches the read test data, then the memory bank is deemed to be functional. Otherwise, if the written test data does not match the read test data, then the memory bank is non-functional. The maintenance processor typically records and reports the write/read test data comparison results.

In certain applications, a maintenance processor is programmed to reinitialize or shut down a computer system and thereby reset the processors and/or memory banks. A maintenance processor may also need to reinitialize memory components such as static random access memory (SRAM) or register arrays. One approach for reinitializing memory components with a maintenance processor uses a test operating mode that disables the system clocks. Computer functions and applications are delayed until the system clocks are enabled. Due to these delays, overall computer system performance is, of course, hindered.

An alternative approach to the foregoing allows a maintenance processor to access memory components dynamically. That is, the clock signal to the memory components remains enabled while the access occurs. This approach, however, requires additional logic, design time, software development time, and test development time. For example, the additional logic used for intermittent dynamic access may impact the target operating frequency of the system clock by inserting additional logic in critical timing paths. This may lengthen design cycles since these critical timing paths must be optimized. Also, these additions may lead to unforeseen software and testing problems.

Accordingly, it would be desirable to provide a manner for addressing the aforementioned and other shortcomings of the prior art. The present invention fulfills these and other needs, and provides a system and method for dynamically accessing memory components during normal system operation.

SUMMARY OF THE INVENTION

To overcome limitations in the prior art described above, and to overcome other limitations that will become apparent upon reading and understanding the present specification, the present invention discloses a system, apparatus and method for dynamically accessing memory under normal operating conditions.

In accordance with one embodiment of the invention, a method is provided for use in dynamically transferring data between a maintenance processing system and a system memory of a computing system during normal functional operation of the computing system. At least a memory access mode and a system memory address are serially scanned into a control scan chain. The memory access mode and system memory address are collectively stepped from the control scan chain into an access register bank in response to a first trigger signal. System memory control input signals are generated in response to a second trigger signal, and the dynamic transfer of the data between the system memory and the maintenance processing system is initiated in response thereto.

According to more particular embodiments of such a method, the memory access mode is a memory write mode that indicates that the dynamic transfer of the data involves writing the data to the system memory. In such a case, the data may be serially scanned into a data scan register, where collectively stepping thus involves collectively stepping the memory access mode and the system memory address from the control scan chain into an access register bank, and stepping the data from the data scan register to the access register bank. The data may be transferred from the access register bank to the system memory in response to the second trigger signal and according to the system memory control input signals.

According to other particular embodiments of such a method, the memory access mode is a memory read mode that indicates that the dynamic transfer of the data involves reading the data from the system memory. In such case, the data from the system memory may be transferred into a data scan register, and serially scanned out from the data scan register to the maintenance processing system.

In still other embodiments of such a method, the first trigger signal is provided in response to completion of the serial scanning into the control scan chain. More particularly, completion of the serial scanning into the control scan chain may be monitored by the maintenance processing system, which provides the first trigger signal in response thereto.

In accordance with another embodiment of the invention, a memory access system is provided for facilitating dynamic access of memory by way of a maintenance processing system. This dynamic access is allowed during standard operation of a computing system which utilizes the memory. The memory access system includes an access register bank, and a control register bank coupled to receive scanned address and control signals. The control signals include at least a maintenance mode control signal indicative of a memory access operation via the maintenance processing system. A step multiplexer is coupled to the control register bank to transfer the scanned address and control signals from the control register bank to the access register bank in response to completion of receipt of the scanned address and control signals. A select multiplexer is coupled to the access register bank which, in response to a clock trigger signal, selects the scanned address and control signals as opposed to standard operational address and control signals produced by the computing system. The scanned address and control signals specify data locations and access mode at the memory.

In more particular embodiments of such a system, the control register bank includes a plurality of serially scannable registers coupled in series to receive the scanned address and control signals. In another embodiment, a data register is coupled to receive data to be written from the maintenance processing system to the memory. The data register may be a serially scannable data register coupled to the maintenance processing system to serially receive the data to be written. The step multiplexer may be further coupled to such data register to transfer the data from the data register to the access register bank in response to completion of receipt of the scanned address, the control signals, and the data. In a memory "write" operation such as this, the control signals include a write mode signal, and the select multiplexer is coupled to the access register bank to further select the data originating from the maintenance processing system as opposed to data produced by the computing system. When the memory receives the write mode signal via its read/write control input, it stores the data originating from the maintenance processing system. In a particular embodiment, an initial memory address may be provided, and an address incrementor is coupled to the access register bank to receive the initial memory address and to increment the address for each subsequent data block to be written to the memory.

In other particular embodiments of such a system, the scanned control signals include a read mode signal specifying a read memory mode as the access mode at the memory. A data register is provided, which is coupled to receive data from the memory. An address incrementor may be provided to receive the scanned address, and to increment the scanned address for each subsequent data block to be read from the memory.

In accordance with another embodiment of the invention, a system is provided for dynamically accessing memory operating in a computing system. The system includes a maintenance processing system having a processor configured to generate first and second trigger signals, and to generate serial scan data including a memory address(es) and control signals. The control signals include a maintenance mode control signal indicative of a memory access operation via the maintenance processing system. The system includes a block mode wrapper coupled between the maintenance processing system and the memory. The block mode wrapper includes at least a control register bank coupled to receive the serial scan data, an access register bank, a step multiplexer, and a select multiplexer. The step multiplexer is coupled to the control register bank to transfer the serial scan data from the control register bank to the access register bank in response to the first trigger signal. The select multiplexer is coupled to the access register bank to, in response to the maintenance mode control signal and the second trigger signal select the memory address and control signals from the maintenance processing system as opposed to standard operational address and control signals produced by the computing system. The scanned address and control signals specify data locations and access mode at the memory.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

It may be beneficial to utilize a maintenance processor for maintaining operational and functional integrity of computing systems components, including processor and memory components. A maintenance processor generally implements maintenance and/or utility functions for testing system operations and computer system components for functional integrity. Memory components can be tested for functional integrity by writing and reading test data using a maintenance processor.

One way to test memory components is to disable system clocks, then perform verification using a special test mode. However, if the maintenance processor interrupts the computer system clocks, processor execution is halted, decreasing system throughput. Thus, it is desirable for a maintenance processor to access memory components dynamically such that clocks remain enabled during the test operation. As previously mentioned, prior maintenance processor implementations that are capable of providing dynamic access require additional logic, resulting in additional design and test development time.

The maintenance processor may perform other utility functions besides system testing. For example, the maintenance processor may perform system partitioning to divide a complex computer system into a number of independent virtual computers. In a system that supports dynamic partitioning via the maintenance processor, the maintenance processor needs dynamic read and/or write access to certain memories, register arrays and/or other storage elements. However, providing an additional access path for this partitioning function may add additional logic to critical timing paths, reducing overall system performance for a function that is performed intermittently.

In accordance with the foregoing, the present invention is directed generally to a system and method for dynamically accessing memory under normal operating conditions (e.g., without interrupting computer system clocks that are otherwise executing). According to an exemplary embodiment, a maintenance processing system (MPS) dynamically accesses memory via dynamic logic with the system clock(s) enabled. This allows, for example, memories such as static random access memories (SRAMs) and register arrays to be reinitialized during dynamic partitioning of the system. For such a dynamic access solution in accordance with the present invention, no additional logic components are needed in any memory access path that is used during normal operation. Any additional logic for the dynamic access solution is confined to independent memory access paths used for access by the maintenance processor. A variety of types and sizes of memory components may be accessed dynamically in this environment to provide a scaleable dynamic access solution, and the memory components may have various data widths. For example, SRAMs and register arrays having single or multi port access may be accessed dynamically with a maintenance processor in accordance with the present invention.

Figure 1:
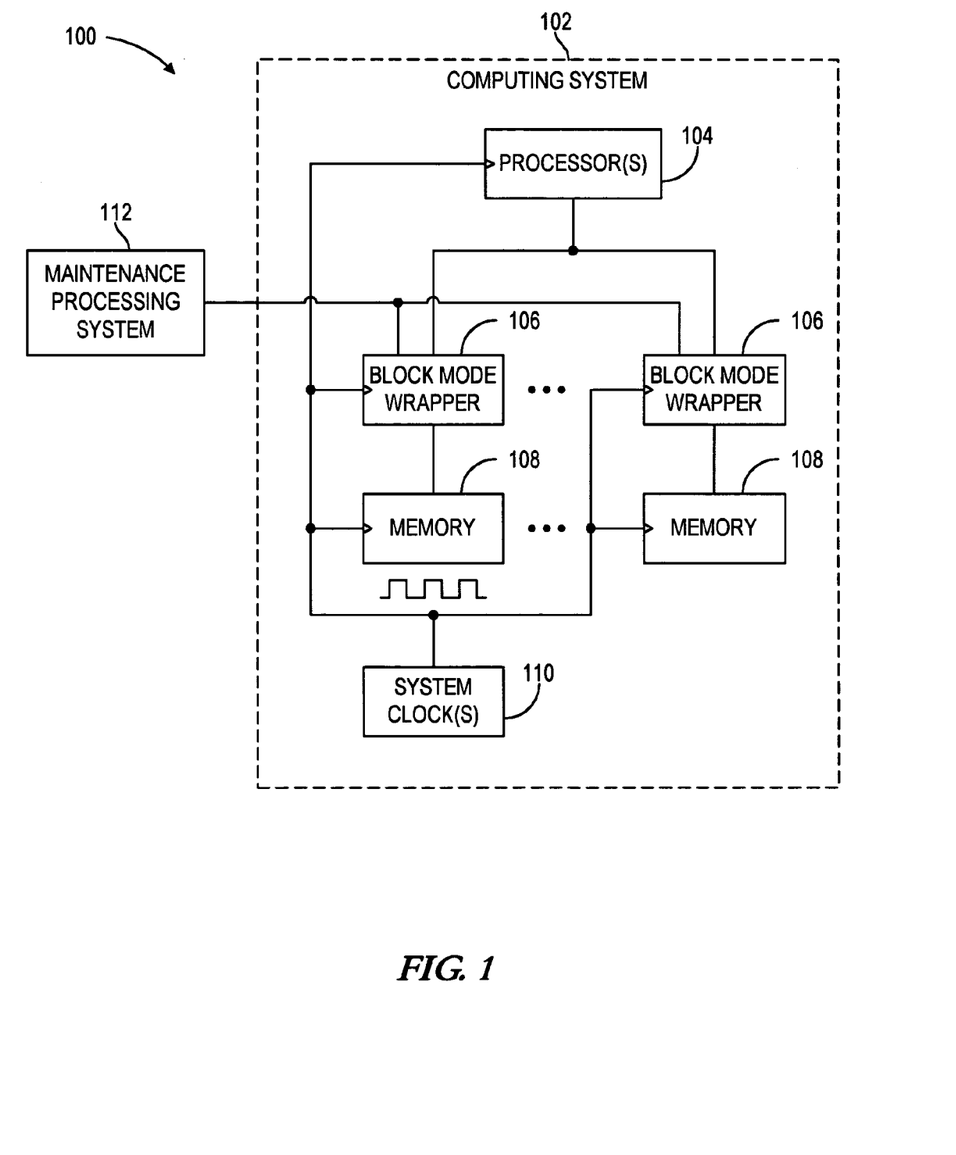
FIG. 1 illustrates a block diagram of a maintenance access system for dynamically accessing memory in accordance with the various embodiments of the present invention.

FIG. 1 illustrates a block diagram of a maintenance access system for dynamically accessing memory in accordance with the various embodiments of the present invention. The maintenance access system 100 includes a computing system 102 and a maintenance processing system (MPS) 112. The computing system 102 includes processor(s) 104, block mode wrappers (BMW) 106, memories 108, and system clock(s) 110. Each of the memories 108 may be a SRAM, DRAM, register array (RA), or another type of memory and each may have one or more access ports. It will be noted that although the following discussion primarily focuses on SRAMs and RAs, this embodiment is merely exemplary.

In general, the MPS 112 can access memories 108 with the system clock(s) 110 running if the dynamic logic of a BMW 106 is activated. The MPS 112 can perform maintenance and utility functions, such as testing a memory 108, without interrupting functional operations of the computing system 102. For example, the MPS 112 coupled with a BMW 106 can write test data into one of the associated memories 108, read the same test data from that associated memory, and compare results to determine if the memory is operating correctly. Furthermore, the logic of a BMW 106 is easily extensible such that the MPS 112 can access various types and sizes of memory components. The maintenance access system 100 provides a scaleable design solution for dynamically accessing various memory components.

The MPS 112 initiates a dynamic access by sending input signals to at least one of the BMWs 106. In one embodiment the input signals include control signals, such as a dynamic pulse signal, and serial scan signals. The dynamic pulse signal initializes the dynamic logic of a BMW 106 that provides dynamic access to the associated memory 108. Various dynamic access modes and the access address may be serially shifted into a control scan chain, and collectively loaded by step logic into dynamic access control registers within the BMW 106. The step logic updates the access registers from the control scan chain at the end of a scan operation, thereby preventing the access registers from having indefinite values during the serial scan. The bits of the access mode of the dynamic access control registers (e.g., select enable, write enable, and read enable) collectively determine the operational mode of the BMW 106. Representative operational modes of the BMW 106 include a functional mode, a dynamic read mode, and a dynamic write mode.

In the case of the dynamic read mode, the dynamic pulse signal from MPS 112 enables read logic of BMW 106 to transfer the data from an addressed location in one of the memories 108 to a data scan chain of the BMW 106. The MPS 112 may then serially shift the data scan chain to obtain the memory data for the dynamic read. For dynamic write mode operations, the MPS 112 may serially shift the write data into the data scan chain, followed by the dynamic pulse signal from MPS 112 enabling write logic to transfer the data to an addressed location in memory 108. In this manner, the MPS 112 provides maintenance or utility functions while functional logic of the computing system 102 continues to operate in a normal processing mode.

During normal operation of the computing system 102, functional logic including processor(s) 104 may directly access the memories 108 or may indirectly access the memories 108 via the BMW 106, depending on the specific design implementation and the number of access ports for these memory. Assuming a memory 108 having a single port, the MPS 112 and the functional logic share this single port via the BMW 106. The BMW 106 is loaded with an access mode that determines which logic will gain access to this memory port. For example, the normal functional logic gains access to the port when the associated BMW 106 is configured to operate in a functional mode. Conversely, the memory port is accessed by the MPS 112 when BMW 106 is configured to operate in dynamic access mode. Preferably, the MPS 112 accesses the memory 108 during a time period when the functional logic is not also trying to access the memory 108 in order to avoid a conflict between the MPS 112 and the functional logic.

Assuming a memory 108 having multiple ports, the MPS 112 and the functional logic may share one or more ports via the BMW 106, while other memory port(s) are directly accessed by the functional logic depending on the specific design implementation. Any shared memory ports may be accessed by the MPS 112 or functional logic according to the access mode. The functional logic may directly access the other port(s), regardless of the access mode of the BMW 106. A shared memory port may be accessed by the MPS 112 or functional logic as illustrated in FIG. 2.

Figure 2:
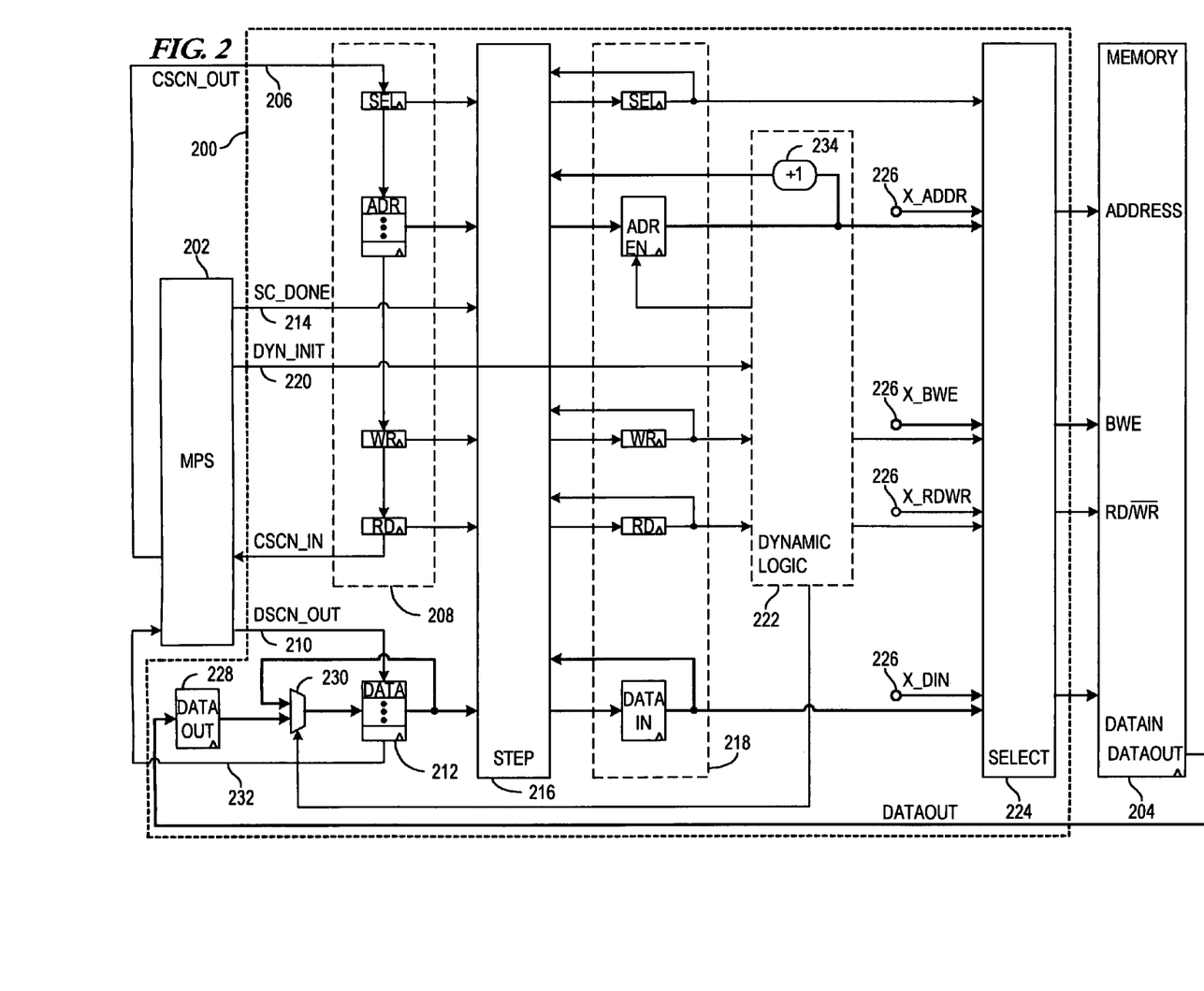
FIG. 2 illustrates a block diagram of a maintenance access system for dynamically accessing memory in accordance with the various embodiments of the present invention.

FIG. 2 illustrates a block diagram of a representative maintenance access system for dynamically accessing memory in accordance with one embodiment of the present invention. The embodiment illustrated in FIG. 2 includes a maintenance processing system (MPS) 202 and a memory 204 in addition to block mode wrapper (BMW) logic 200 (shown dashed). In one embodiment, the BMW logic 200 is located on the same logical device (e.g., Application Specific Integrated Circuit or other chip) as memory 204, although this need not be the case, and the memory may be a discrete component. The BMW 200 couples with MPS 202 to dynamically access memory 204 in a manner similar to that illustrated by BMWs 106, MPS 112, and memories 108 of FIG. 1. Functional logic (not shown), such as a processor 104 in FIG. 1, shares access to the memory 204 with the MPS 202 by way of the BMW 200.

The MPS 202 starts a dynamic access by serially scanning an indicator for an access mode and an access address on control scan-out (CSCN_OUT) line 206 into control scan chain 208. In the case of a dynamic write operation, the MPS 202 also serially scans write data on data scan-out (DSCN_OUT) line 210 into data scan chain 212. The input parameters for the dynamic access include the access mode, access address, and any write data. The MPS 202 asserts a serial scan done signal (SC_DONE) on line 214 when a scan is not in progress, to cause step multiplexer 216 to transfer the values from the serial scan chains 208 and 212 to access registers 218. During a serial scan of scan chains 208 and 212, the de-asserted scan done signal (SC DONE) on line 214 generally causes step multiplexer 216 to provide the output values of access registers 218 to the inputs of access registers 218, thereby maintaining access registers 218 at static values during a serial scan. Thus in one embodiment, access registers 218 are generally updated only at the end of a scan, and do not have indefinite values during a scan of scan chains 208 and 212.

After the MPS 202 has loaded access registers 218 in preparation for a dynamic access, the MPS 202 generates the dynamic pulse (DYN_INIT) on line 220, typically for one clock cycle. The clock used to generate the dynamic pulse may be, for example, the same clock used by memory 204, the clock for a clock domain including memory 204, or another clock. The dynamic pulse on line 220 may cause dynamic logic 222 to generate memory control inputs for the dynamic access, depending on the dynamic access specified by access registers 218. The select multiplexer 224 selects the inputs to memory 204 from either external inputs on lines 226A, 226B, 226C and 226D from normal functional logic, or inputs from the dynamic logic 222 and access registers 218.

For a dynamic access that is a dynamic read, after the MPS 202 generates the dynamic pulse on line 220, the data from memory 204 for the dynamic read steps through data out register 228 to read multiplexer 230 and data scan register 212. The MPS 202 may then serially shift register 212 and receive the data for the dynamic read on data scan-in line 232. In the case of a dynamic access that is not a dynamic read, read multiplexer 230 may circulate the output value of data scan register 212 to the input of data scan register 212, thereby keeping data scan register 212 at a static value.

A block mode wrapper that does not provide dynamic access may include the control scan register 208, data scan register 212, and select multiplexer 224 blocks, and may omit the step multiplexer 216, access registers 218, dynamic logic 222, data out register 228, and read multiplexer 230 blocks. The external inputs 226A, 226B, 226C, 226D from normal functional logic share access with a block mode wrapper 200 via select multiplexer 224 regardless of whether or not a block mode wrapper implements dynamic access. Some type of block mode wrapper may be necessary to satisfy other system test and maintenance requirements. Thus, dynamic access provided by the MPS 202 via the block mode wrapper 200 does not add extra logic to the memory 204 access path (including lines 226A, 226B, 226C and 226D) used by normal functional logic.

The dynamic logic 222 may provide an address increment function with increment block 234 to increment the address after each dynamic access. The "+1" represents an increment of an address, regardless of the bit width of the address. To initialize memory 204 with specific values for each address, the MPS 202 may serially scan a dynamic write and memory starting address into control scan chain 208. Then, for each sequential memory location, the corresponding data is scanned into data scan chain 212, the scan done (SC_DONE) on line 214 is asserted, and the dynamic pulse (DYN_INIT) 220 is asserted. A serial scan of values into the control scan chain 208 is needed only for the starting address. The separate data scan chain 212 may allow the limited serial scan bandwidth to be efficiently used for data transfer of initialization values for memory 204. Similar efficient usage of serial scan bandwidth may be achieved when reading the contents of memory 204.

The width of the data scan chain 212 may be easily adjusted to match the data width of memory 204. Modification of the width of data scan chain 212 does not change the BMW 200 signal interface, including data scan-out 210 and data scan-in 232.

After completing a dynamic access or a series of dynamic accesses, the MPS 202 may return the BMW 200 to normal functional mode by scanning values for functional mode into control scan chain 208, and asserting scan done (SC_DONE) on line 214.

The bits of the access mode determine the operational mode of the BMW. In one embodiment, the operational mode involves either a functional mode or a dynamic access mode. Dynamic read mode and dynamic write mode are examples of dynamic access modes. Table 1 includes representative operational modes of the BMW.

TABLE 1

BMW operational modes

| Mode | Access mode bits | | | |
|---|---|---|---|---|
| | Select enable | Read enable | Write enable | Force enable |
| Functional | 0 | 0 | 0 | 0 |
| Dynamic capture | 0 | 1 | 0 | 0 |
| Dynamic read | 1 | 1 | 0 | 0 |
| Dynamic write | 1 | 0 | 1 | 0 |
| Select hold | 1 | 0 | 0 | 0 |
| Memory initialize | 1 | 0 | 1 | 1 |

The bits of the access mode may include select enable, read enable, write enable, and force enable. Setting the select enable bit enables a dynamic access mode. Setting the read enable bit enables dynamic read access and setting the write enable bit enables dynamic write access. The force enable bit may allow all memory locations to be initialized with one provided data value. It will be appreciated that other encoding values may be used to specify the access modes.

In functional mode and dynamic capture mode, the normal functional logic may transparently access the associated memory. For dynamic capture mode the data currently being output from the associated memory, as controlled by the normal functional logic, may be sampled by the BMW without affecting the operation of the normal functional logic.

For dynamic read, dynamic write, select hold, and memory initialize modes, the normal functional logic may not be able to access the associated memory via one or more of the access ports of the associated memory. The select hold mode holds inputs of the associated memory at a static value. For each dynamic read and dynamic write in the respective mode that is triggered by the dynamic pulse control, the memory address generated by the BMW may be incremented after the dynamic access. Incrementing the memory address allows a series of dynamic accesses to sequential locations in the associated memory without requiring the MPS to update the address for each dynamic access. For the memory initialize mode, the force enable bit of the access mode may cause the memory address to be continuously incremented such that the memory address counts repeatedly through all memory addresses. A complete cycle of memory writes may initialize all of the associated memory or some designated subset thereof.

Figure 3A:
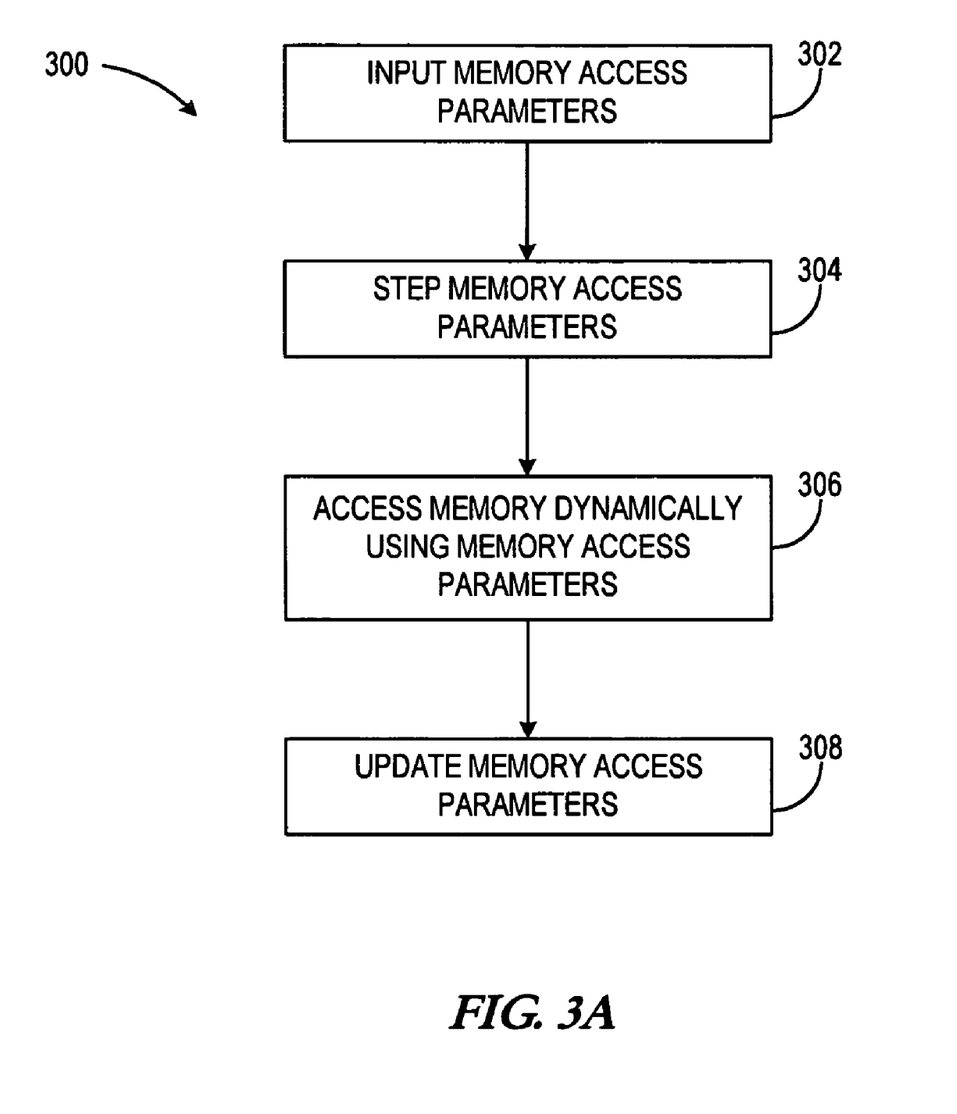
FIG. 3A is a flow chart illustrating a representative method for accessing memory via a block mode wrapper in accordance with the various embodiments of the present invention.

FIG. 3A is a flow chart illustrating a method for accessing memory via a block mode wrapper in accordance with one embodiment of the present invention. Referring to FIG. 1 in addition to FIG. 3A, the method 300 for accessing memory may occur dynamically, i.e. without interrupting the system clock(s) 110. At block 302, the maintenance processing system (MPS) 112 sends input parameters to one of the block mode wrappers (BMW) 106 as illustrated in FIG. 1. The input parameters may be scanned into one or more scan chains of the BMW 106. These input parameters may include the access mode, access address, and optional write data.

At block 304, the values of the input parameters, including the access mode, are transferred to access registers via step logic (e.g., multiplexers). The bits of the access mode collectively generate the operational mode of the BMW 106. BMW 106 operational modes may include functional mode, dynamic read access, and dynamic write access. The dynamic access modes may require control signals from the MPS 112 to activate the dynamic logic of the BMW 106. The dynamic logic of a BMW 106 may perform a dynamic access of associated memory 108 while functional operations are being simultaneously executed with the system clock(s) 110 running.

At step 306, when the access mode specifies a dynamic access mode, the BMW 106 is triggered by a dynamic pulse from the MPS 112 to dynamically access the associated memory 108. The dynamic pulse activates dynamic logic of BMW 106 to dynamically access associated memory 108. For a dynamic write, the write data provided by the MPS 112 at step 302 is written to associated memory 108 at the address provided by the MPS 112 at step 302. For a dynamic read, data is read from the associated memory 108 at the address provided by the MPS 112 at block 302.

At block 306, when the access mode specifies functional mode, a logic block of the computing system 102, such as the processor(s) 104, accesses the memories 108 via the BMWs 106. The system clock(s) 110 synchronize the transfer of data between the logic block and the memories 108 via the BMWs 106 at block 306.

At block 308, the parameters of the memory access may be updated. For example a memory address may be automatically incremented, such that a next dynamic access is initiated at block 306.

Figure 4:
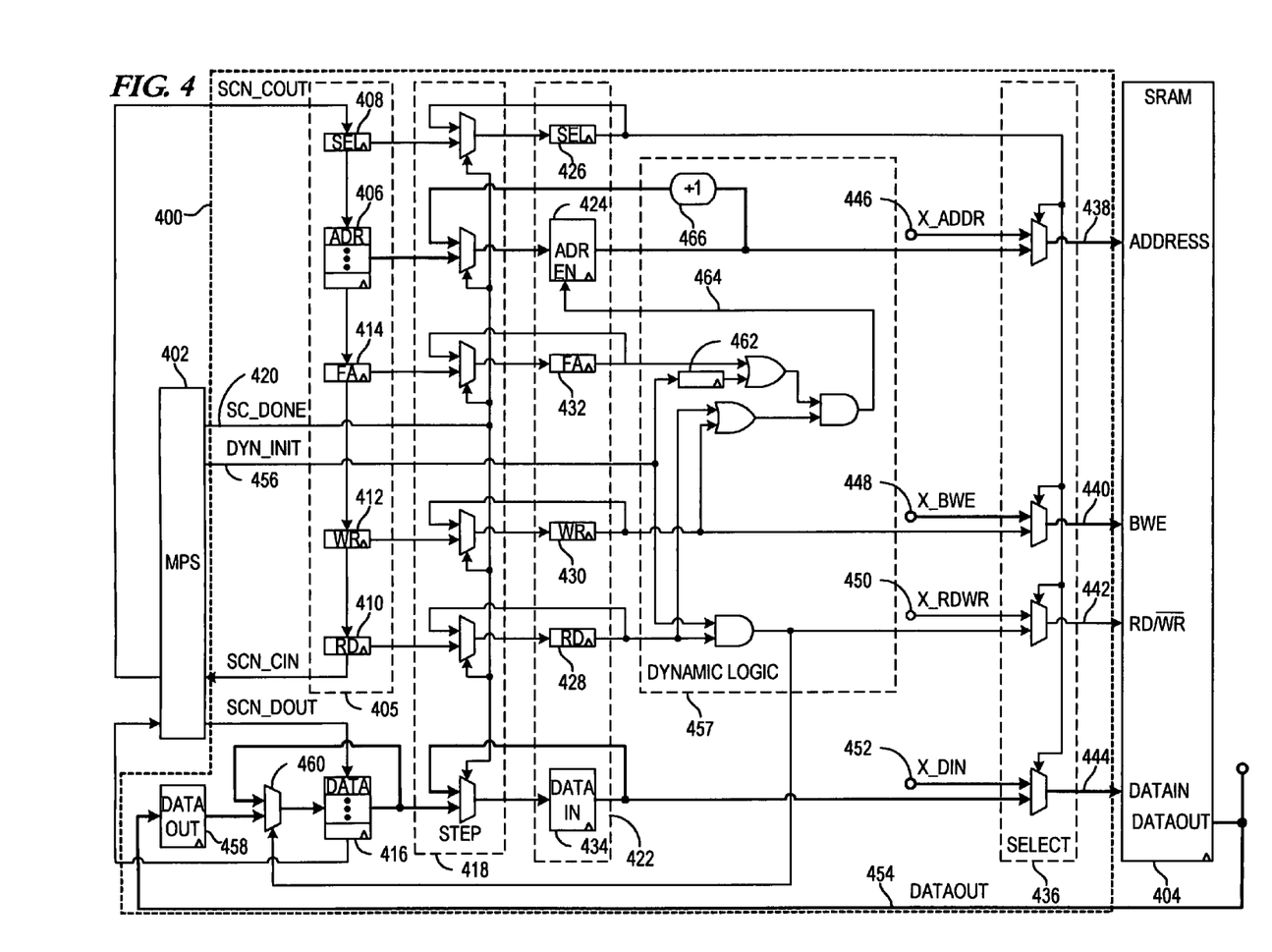
FIG. 4 illustrates a block diagram of a maintenance access system for dynamically accessing a single port SRAM in accordance with the various embodiments of the present invention.
Figure 5:
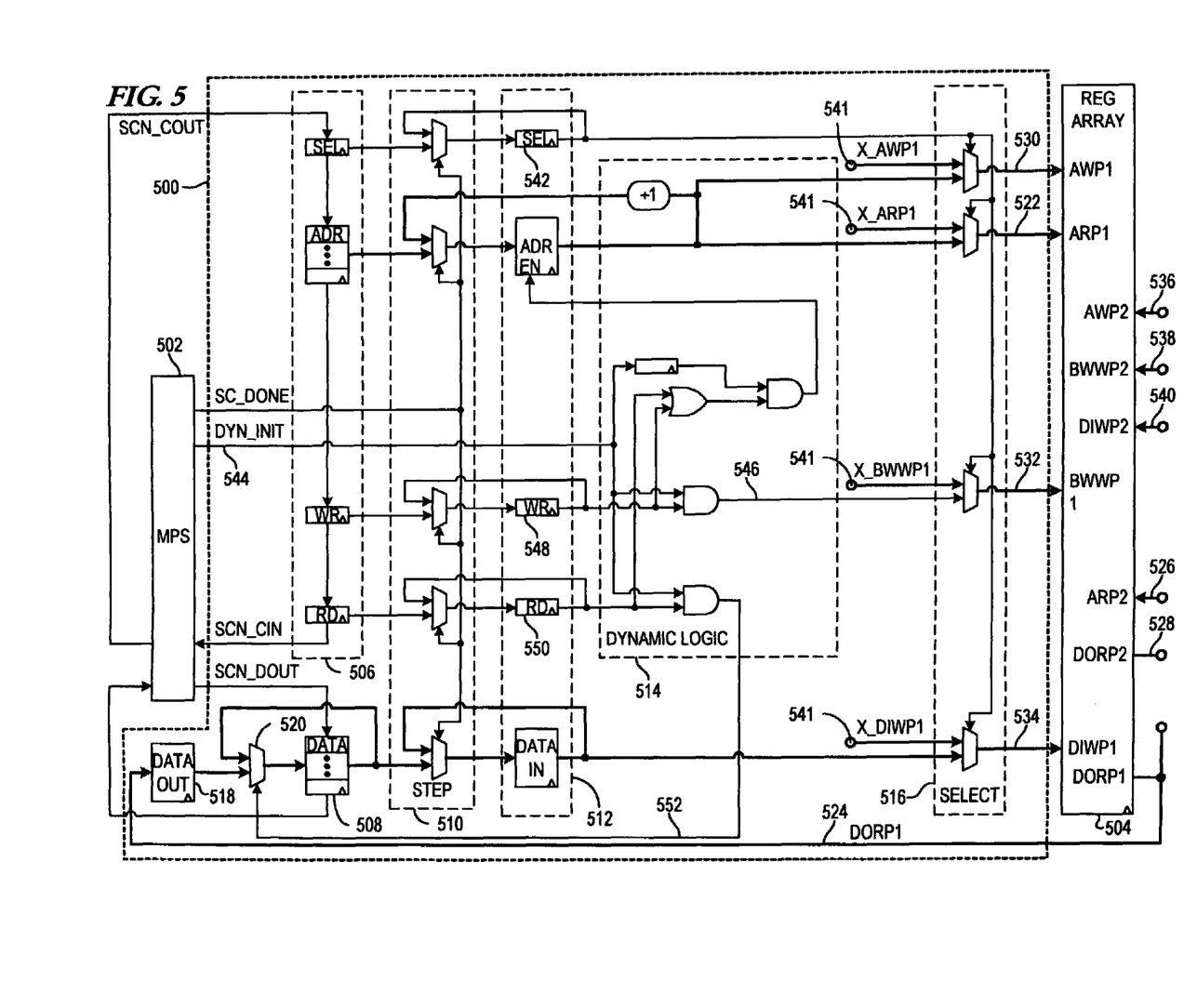
FIG. 5 illustrates a block diagram of a maintenance access system for dynamically accessing a multi-port register array in accordance with the various embodiments of the present invention.

The dynamically accessed memory 108 in FIG. 1 can involve single or multi-port access. Additionally, the memory 108 may be static random access memory (SRAM), register array, or other arrangements of memory components. FIG. 4 and FIG. 5 illustrate embodiments of the present invention involving different representative types of 5 memory arrangements. The various embodiments of the present invention are not limited to the illustrated memory arrangements.

Figure 3B:
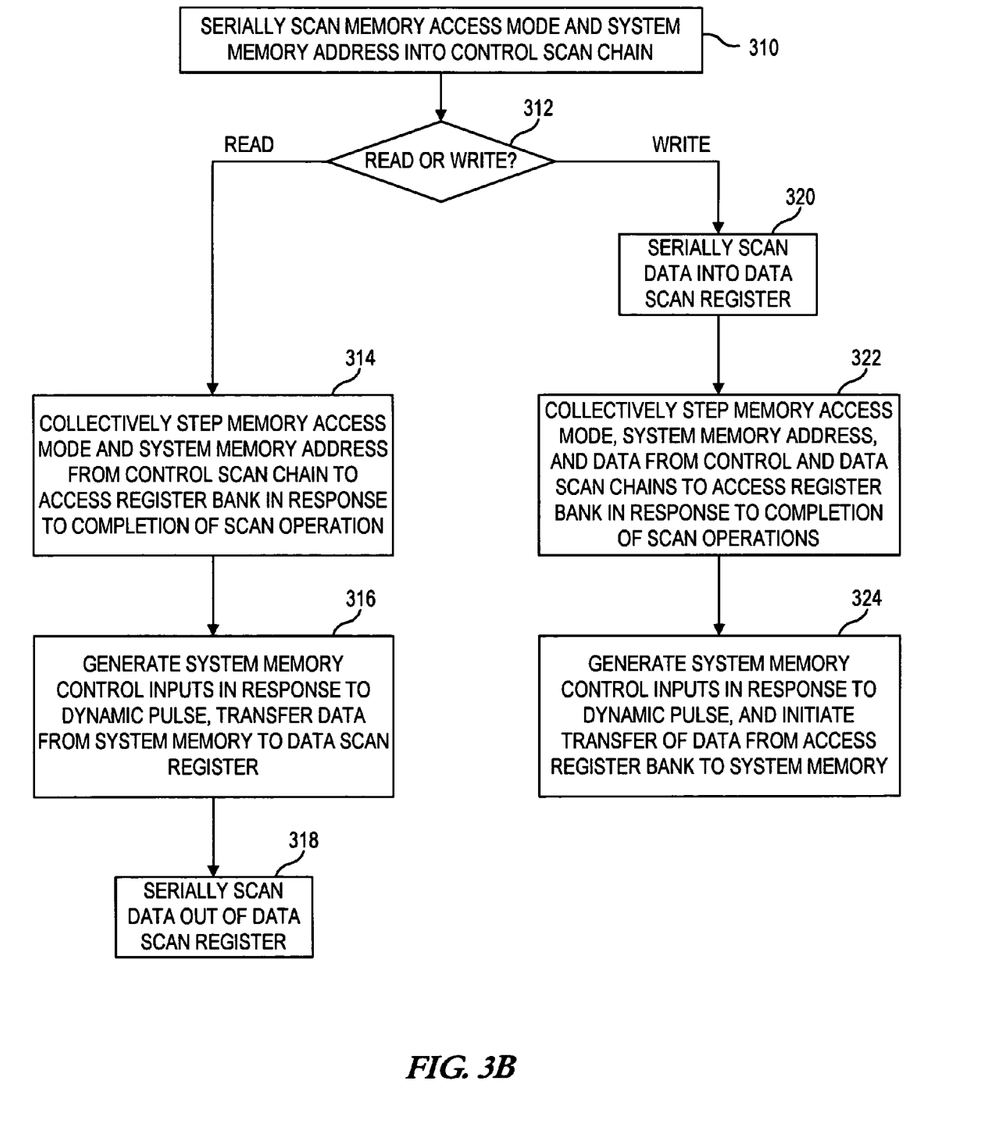
FIG. 3B is a flow chart illustrating a representative method for reading and writing system memory according to one embodiment of the invention.

FIG. 3B is a flow chart illustrating a representative method for reading and writing system memory according to one embodiment of the invention. While other modes are available and described elsewhere herein, FIG. 3B relates to dynamic reading and/or writing of the system memory. A memory access mode and a system memory address are serially scanned into a control scan chain at block 310. If the memory access mode is a read access mode as determined at decision block 312, the read access mode information and system memory address are collectively stepped 314 from the control scan chain to an access register bank in response to completion of the scan operation, which may be indicated by a first triggering signal such as the SC_DONE signal (see, e.g., SC_DONE 214 of FIG. 2). System memory control inputs are generated in response to a second triggering signal, such as the DYN_INIT 220 of FIG. 2, and in response, the data is transferred from the system memory to a data scan register as shown at block 316. The data can then be serially scanned out of the data scan register as shown at block 318.

If the memory access mode is a write access mode as determined at decision block 312, the write data is serially scanned 320 into a data scan register. The write access mode information, system memory address, and data are collectively stepped 322 from the control scan chain and data scan register to the access register bank in response to completion of the scan operations (e.g., in response to SC_DONE 214 of FIG. 2). System memory control inputs are generated in response to a dynamic pulse, such as the DYN_INIT 220 of FIG. 2, and the data is transferred from the access register bank to the system memory as shown at block 324.

FIG. 4 illustrates a block diagram of a maintenance access system for dynamically accessing a single port SRAM in accordance one embodiment of the present invention. The diagram illustrates a maintenance processing system (MPS) 402 and an SRAM 404 in addition to the logic for the block mode wrapper (BMW) 400. The BMW 400 of the illustrated embodiment couples with MPS 402 to dynamically access SRAM 404 in a manner similar to that of BMW 200, MPS 202, and memory 204 illustrated and described in connection with FIG. 2.

The MPS 402 may specify the SRAM access by scanning values into control scan chain 405. The control scan chain 405 includes registers for an access address 406 and the bits of the access mode (select enable 408, read enable 410, write enable 412, and force enable 414). It will be appreciated that the bits 408, 410, 412, and 414 of the access mode and the individual bits of the address 406 may occur in any order in the control scan chain 405. The access mode bits 408, 410, 412, 414 may determine the type 10 of access performed by the BMW 400 as previously discussed in connection with Table 1.

For the dynamic write and memory initialize access modes, the MPS 402 may additionally specify the write data by scanning into data scan chain 416. In the illustrated embodiment, the initial value of data scan chain 416 may be ignored for other access modes. As an example, in order to specify a dynamic access that clears the contents of SRAM

404, the access mode (bits 408, 410, 412, and 414) may be set to memory initialize, the access address 406 may be set to zero, and the write data 416 may be set to zero.

After the MPS 402 has specified the values in the control scan chain 405 and optionally the data scan chain 416, the MPS 402 asserts a scan done signal (SC_DONE) on line 420 to transfer the values for chains 405 and 416 to access registers 422. The scan done signal (SC_DONE) may be generated by logic associated with a test access port (TAP) of the MPS 402 that monitors when the scan is active for chains 405 and/or 416. An asserted scan done signal (SC_DONE) on line 420 transfers the data associated with registers 406, 408, 410, 412, 414, and 416 to registers 424, 426, 428, 430, 432, and 434 respectively.

When the MPS 402 provides a value of zero to the select access register 426 for functional and dynamic capture modes, the select multiplexers 436 are steered to allow the normal functional logic to control access to SRAM 404. The address 438, byte write enables 440, read access control 442, and data-in 444 inputs of SRAM 404 are controlled by the normal functional logic by respective BMW 400 inputs 446, 448, 450, and 452 from a logic block, such as processors 104 of the computing system 102 illustrated in FIG. 1. In dynamic capture mode, the value of the SRAM data output 454 (DATAOUT), as controlled by the normal functional logic, may be sampled periodically.

The MPS 402 may assert the dynamic pulse (DYN_INIT) 456 for one clock cycle to begin a dynamic access for the dynamic capture, dynamic read, and dynamic write modes. The dynamic pulse (DYN_INIT) 456 may be generated by a special instruction of a TAP associated with the MPS 402. The dynamic pulse 456 activates logic in dynamic logic block 457.

For a dynamic write, first values such as binary "1" for the select access 426 and write access 430 cause the data 434 to be written into SRAM 404 at the access address 424. Although a SRAM 404 may have a number of byte write enables 440, one write access bit 430 may provide the value for all byte write enables 440 such that the full width of the SRAM 404 is written by a dynamic write. In another embodiment, the width of write enable 412 and write access 430 registers may match the number of byte write enables 440 of SRAM 404, allowing the specification of the bytes to be written by a dynamic write. SRAM 404 may omit the byte write enable 440 inputs and instead use a de-asserted read access control 442 to specify a write cycle in an alternative embodiment.

For a dynamic read, first values such as "1" for the select access 426 and read access 428 may cause data to be read from SRAM 404 at address 424 and delivered on line 454 to data-out register 458. During the dynamic pulse on line 456, read multiplexer 460 provides the data read from SRAM 404 to data scan chain 416. The MPS 402 may then serially shift the data scan chain 416 to obtain the read data. Operation for a dynamic capture is similar to a dynamic read except the address 438 of SRAM 404 that is read is determined by the value provided by normal functional logic on line 446.

During select hold mode in the illustrated embodiment, providing a value of "1" for the select access 426 causes the address 438, byte write enables 440, read access control 442, and data-in 444 inputs of SRAM 404 to be held at static values.

The delay register 462 provides a one-cycle delay to the dynamic pulse (DYN_INIT) on line 456 in the illustrated embodiment. After a dynamic read or a dynamic write, the DYN_INIT pulse delayed by register 462 is used to generate a load enable 464 for access address register 424, causing access register 424 to load the prior address value incremented by increment block 466. Thus, a single scan of control scan chain 405 may specify the starting address for a sequence of dynamic reads or dynamic writes. The MPS 402 may alternately assert dynamic pulse (DYN_INIT) on line 456 and scan data chain 416 to access sequential locations in SRAM 404.

For memory initialize mode in the illustrated embodiment, the value of binary "1" for the force access (FA) 432 register causes the load enable 464 of access address register 424 to be continuously asserted. The resulting access address 424 counter generates a sequence of write operations to sequential locations of SRAM 404 with the data from data write register 434. In one embodiment, the MPS 402 can initialize the entire contents of SRAM 404 by waiting to cancel the memory initialize mode until all SRAM 404 locations have been written. For example, the MPS 402 can wait to cancel the memory initialize mode for a number of clock cycles corresponding to the number of SRAM 404 locations that are to be written, thereby initializing the entire contents of SRAM 404. The MPS 402 may cancel memory initialize mode by loading another mode into control chain 405, and asserting scan done (SC_DONE) shown on line 420.

FIG. 4 illustrates an exemplary embodiment involving an SRAM 404 with a single access port in which either the external signals 446, 448, 450, and 452 control access to the SRAM 404, or alternatively internal signals control access to SRAM 404. The external signals 446, 448, 450, and 452 may not access SRAM 404 at the same time as the BMW 400 internal signals because the SRAM 404 has a single access port. Functional operations may occur that do not access the SRAM 404 while the maintenance processing system (MPS) dynamically accesses the SRAM 404. However, a conflict or error condition may arise if functional operations access the single port SRAM 404 while the MPS dynamically accesses the SRAM 404 via the BMW 400.

FIG. 5 illustrates a block diagram of a maintenance access system for dynamically accessing a multi-port register array in accordance with one embodiment of the present invention. The maintenance access system includes a maintenance processing system (MPS) 502 and a register array 504 similar to the MSP 202 and memory 204 described in connection with FIG. 2. The maintenance access system also includes a block mode wrapper (BMW) 500 similar in function to the BMW 200 of FIG. 2, which includes control scan chain 506, data scan chain 508, step multiplexers 510, access registers 512, dynamic logic 514, select multiplexers 516, data-out register 518, and read multiplexer 520.

The representative multi-port register array 504 has four access ports, including two read ports and two write ports in the illustrated embodiment. A first read address depicted on line 522 serves as a control input for a first read port (ARP1) of register 504, while a first data-out on line 524 represents an output (DORP1) for the first read port of register 524. A second read address on line 526 serves as a control input for a second read port (ARP2) of register array 504, while a second data-out on line 528 represents an output (DORP2) for the second read port of register array 504. The inputs for a first write port of register array 504 include a first write address on line 530, first byte enables on line 532, and a first data-in on line 534. The inputs for a second write port of register array 504 include a second write address on line 536, second byte enables on line 538, and a second data-in on line 540.

BMW 500 interfaces with the first read port on lines 522 and 524 and with the first write port on lines 530, 532, 534.

The inputs 522, 530, 532, and 534 for both the first read port and first write port are generated by the select multiplexer 516. The select multiplexer 516 selects either external inputs on lines 541 or outputs from the access register 512 or dynamic logic 514 based on the value of the select access 542 of the access register 512. The output for the first read port on line 524 is routed to the data-out register 518 and functional logic may additionally be coupled to line 524.

The access modes of the maintenance access system are determined by the values of registers including the select access register 542, write access register 548, and read access register 550. The various access modes of the maintenance access system are very analogous to the various access modes of the maintenance access system described in connection with FIG. 4 and Table 1, with an exception that memory initialize mode is not implemented by the maintenance access system embodiment illustrated in FIG. 5, but may be implemented in other embodiments.

The dynamic logic 514 is triggered by the dynamic pulse (DYN_INIT) on line 544 from the MPS 502. For a dynamic write with access mode registers 542 and 548 having a value of binary "1" and register 550 having a value of binary "0", the dynamic logic 514 generates an asserted write enable on line 546 during the dynamic pulse (DYN_INIT) on line 544. The register array 504 may have multiple write enables for each write port, including byte write enables 532 for a first write port. The full width of the register array 504 is written during a dynamic write operation with the write enable on line 546 providing the value for all byte write enables 532 via select multiplexer 516.

For a dynamic read with access mode registers 542 and 550 having a value of "1" and register 548 having a value of "0", the dynamic logic 514 generates an asserted read access on line 522. Further, for a dynamic capture with access mode registers 542 and 548 having a value of "0" and register 550 having a value of "1", the dynamic logic also generates an asserted read access on line 522. The asserted read access on line 522 transfers the value from data-out register 518 to data scan chain register 508.

For select hold with access mode register 542 having a value of "1" and 548 and 550 having a value of "0", no access to register array 504 is performed while inputs 522, 530, 532, and 534 of register array 504 may be held at static values.

FIG. 5 illustrates an example of multi-port access for register array 504, in which register array 504 may be accessed by external functional logic and by the maintenance access system simultaneously. For example, a processor 104 from FIG. 1 may direct a register write operation to the second write port depicted on lines 536, 538, and 540 of register array 504, while the maintenance processing system including MPS 502 and BMW 500 performs a dynamic write operation using the first write port on lines 530, 532, and 534. The register array 504 may represent any one or more of the memory elements 108 of FIG. 1.

Figure 6:
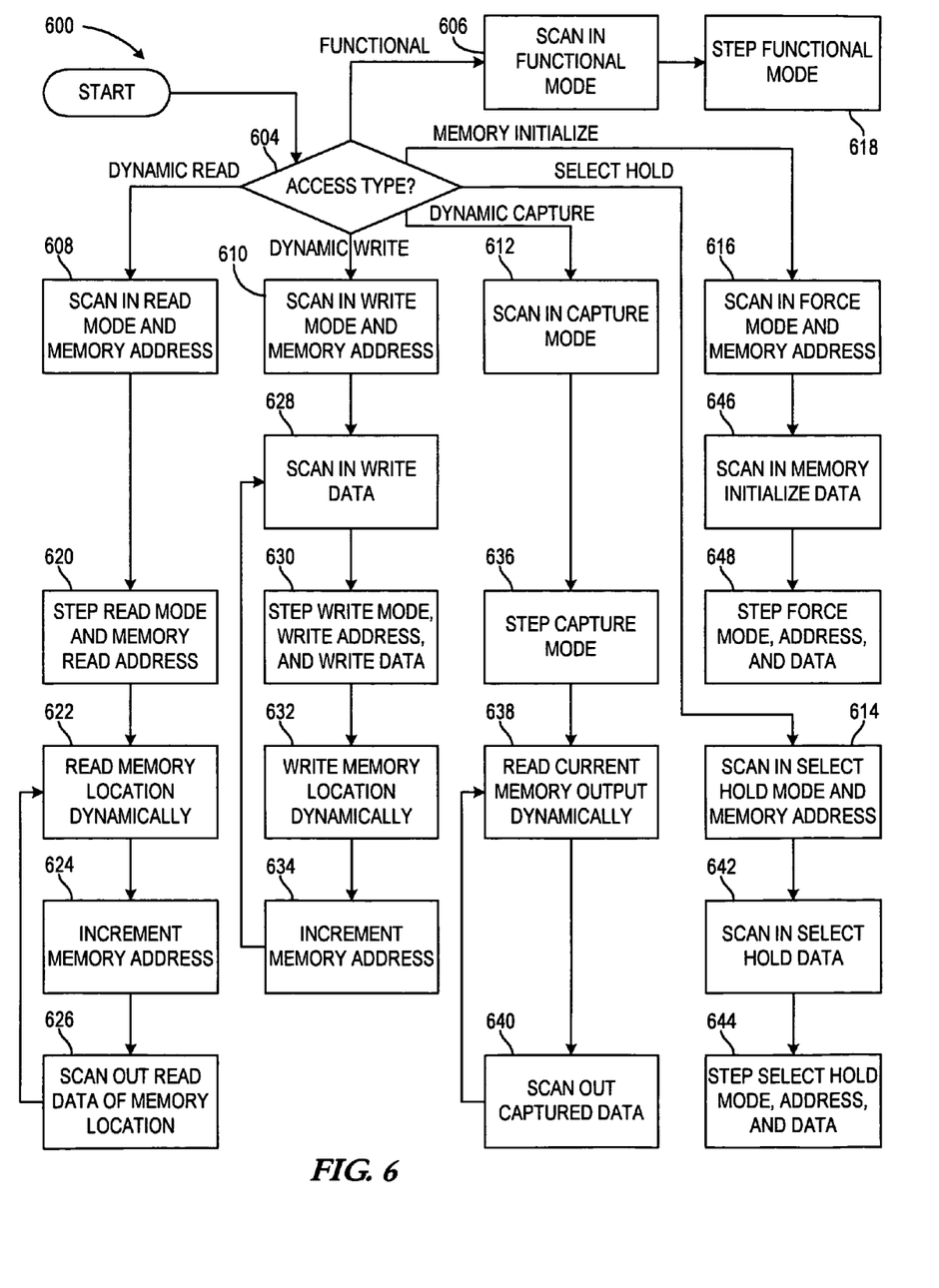
FIG. 6 is a flow chart illustrating a method for accessing a memory in accordance with various embodiments of the present invention.

FIG. 6 is a flow chart illustrating an exemplary method for accessing a memory in accordance with embodiments of the present invention. The memory may be any memory with one or more access ports, such as a single-port or multi-port SRAM or register array. A maintenance processing system (MPS) such as MPS 112 of FIG. 1 may designate the access type and control the memory access method 600. The access type may include, for example, any of a functional, dynamic read, dynamic write, dynamic capture, select hold, or memory initialize access type. Depending on the access type as determined at decision 604, the method proceeds to the operations corresponding to each respective access type.

According to one embodiment of the invention, an initial operation for each access type involves scanning in the corresponding access mode as shown in Table 1 along with any access parameters. For access via normal functional logic, the functional mode is scanned in as shown at block 606. In the case of a dynamic read operation, dynamic read mode and the read address is scanned in as shown at block 608. For a dynamic write operation, dynamic write mode and the write address is scanned in as shown at block 610. For a dynamic capture operation, dynamic capture mode is scanned in as shown at block 612. A select hold operation involves scanning in the select hold mode and the memory hold address as shown at block 614. In the case of a memory initialize operation, the force mode and starting memory address is scanned in as shown at block 616.

More particularly, for memory access via normal operating logic, the functional mode is set by scanning in the functional mode as shown at block 606. When the mode has been set, the MPS may step the functional mode and address information from a scan chain into access registers as shown at block 618, thereby enabling the functional mode.

For a dynamic read operation, the dynamic read mode and memory address are set as shown at block 608. The MPS may then step the dynamic read mode and memory address from the scan chain to the access registers as depicted at block 620. Updating of the access registers is this manner is synchronized with a clock used by the memory. The MPS may assert a dynamic pulse signal to trigger a dynamic read 622 of the memory at the address specified in block 608. As shown at block 624, the dynamic pulse may also cause the memory address to be incremented. The data from memory is scanned out as shown at block 626. The MPS may read the next sequential memory location by an iteration back to block 622.

For a dynamic write operation, the dynamic write mode and memory address are set as shown at block 610. The MPS scans in the data to be written as shown at block 628. The MPS then steps the dynamic write mode, address, and write data as shown at block 630. The MPS then asserts the dynamic pulse signal to trigger a dynamic write 632 of the memory with the write data specified at block 628 at the address specified in block 610. The dynamic pulse may further cause the memory address to be incremented as shown at block 634. The MPS may write the next sequential memory location as depicted by the return path to block 628.

In the case of a dynamic capture, after setting dynamic capture mode at block 612, the MPS may step the dynamic capture mode as shown at block 636. The MPS may read the current memory output dynamically at block 638 by asserting a dynamic pulse signal which triggers the capture of the current value of a data output of the memory. The data from memory may then be scanned out as shown at block 640. The MPS may perform additional dynamic captures as illustrated by the return path to block 638.

For a select hold operation, after setting select hold mode and hold address at block 614, the MPS may scan in the hold data as shown at block 642. The MPS may then step the select hold mode, hold address and hold data as shown at block 644, such that the inputs of the memory are held at these values until a later access by the MPS.

For a memory initialize operation, after setting force mode and the starting address as shown at block 616, the MPS may, at block 646, scan in the initialization data used to initialize every memory location. As shown at block 648, the MPS may step the force mode, starting address, and initialization data. Beginning with the starting address, a sequential location in the memory may be written with the initialization data in each subsequent clock cycle. The entire memory is initialized when the MPS waits for a number of clock cycles greater than the number of memory location before canceling memory initialize. The MPS may cancel memory initialize by performing another type of memory access.

Figure 7:
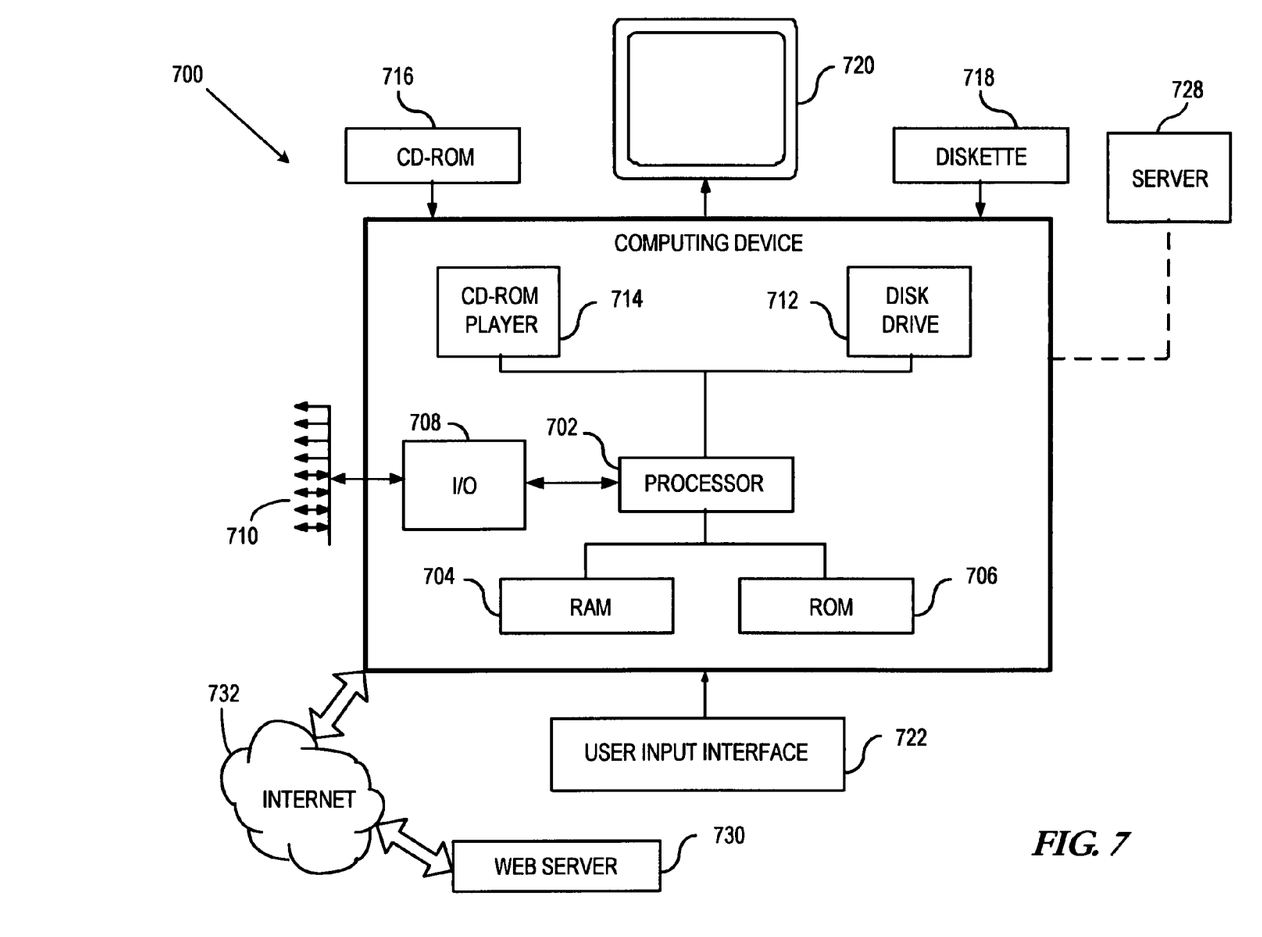
FIG. 7 illustrates a representative computing system capable of performing the maintenance processing system functions.

FIG. 7 illustrates a representative computing system capable of performing the above-described maintenance processing system (MPS) functions such as the MPS 112, 202, 402, 502 depicted in previous figures. Such functions may be implemented using any computing system capable of creating the requisite signals. The computing system may include hardware, firmware, software or a combination thereof. The functional modules used in connection with the invention may reside in a stand-alone or networked computer, or may be integrated with the computer system under test.

The example computing arrangement 700 suitable for performing the MPS functions and operations in accordance with the present invention typically includes a central processor (CPU) 702 coupled to random access memory (RAM) 704 and some variation of read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bus interconnection 710 or some other interconnection mechanism, to provide control signals, communication signals, and the like.

The computing arrangement 700 may also include one or more data storage devices, including hard and floppy disk drives 712, CD-ROM drives 714, and other hardware capable of reading and/or storing information such as DVD, etc. In one embodiment, software for carrying out the MPS operations in accordance with the invention may be stored and distributed on media such as a CD-ROM 716, diskette 718 or other form of media capable of portably storing information. These storage media may be inserted into, and read by, devices such as the CD-ROM drive 714, the disk drive 712, etc. The software may also be transmitted to the computing arrangement 700 via data signals, such as being downloaded electronically via a network, such as the Internet and/or a local network. Further, as previously described, the software for carrying out the functions associated with the present invention may alternatively be stored in internal memory/storage of the computing device 700, such as in the ROM 706. The computing arrangement 700 may be coupled to a display 720. A user input interface 722 (e.g., keyboard, mouse, touchpad or touchscreen, voice-recognition, etc.) may also be provided to allow information to be entered to the computing arrangement 700.

The computing arrangement 700 may be connected to other computing devices, including the computing system associated with the memory under test or otherwise being dynamically accessed according to the present invention. Such a connection may be performed as described herein, such as via a direct connection. The connection may also be performed via a network. For example, the computing arrangement 700 may be connected to a network server 728 in an intranet or local network configuration. The computer may further be part of a larger network configuration as in a global area network (GAN) such as the Internet. In such a case, the computer accesses one or more web servers 730 via the Internet 732. In one embodiment of the invention, the MPS computing arrangement 700 is directly coupled to the BMWs of the present invention using direct coupling, such as point-to-point cabling via the I/O 710 or otherwise.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method for use in dynamically transferring data between a maintenance processing system and a system memory of a computing system during normal functional operation of the computing system, the method comprising:
   serially scanning at least a memory access mode and a system memory address into a control scan chain;
   collectively stepping the memory access mode and the system memory address from the control scan chain into an access register bank in response to a first trigger signal; and
   generating system memory control inputs in response to a second trigger signal and initiating the dynamic transfer of the data between the system memory and the maintenance processing system in response thereto.

2. The method of claim 1, wherein the memory access mode is distinguishable from a normal functional mode by which the computing system engages in the normal functional operation.

3. The method of claim 1, wherein the memory access mode comprises a memory write mode indicating the dynamic transfer of the data involves writing the data to the system memory.

4. The method of claim 3, further comprising serially scanning the data into a data scan register, and wherein collectively stepping comprises collectively stepping the memory access mode and the system memory address from the control scan chain into an access register bank, and stepping the data from the data scan register to the access register bank, in response to the first trigger signal.

5. The method of claim 4, further comprising transferring the data from the access register bank to the system memory in response to the second trigger signal and according to the system memory control inputs.

6. The method of claim 1, wherein the memory access mode comprises a memory read mode indicating the dynamic transfer of the data involves reading the data from the system memory.

7. The method of claim 6, further comprising transferring the data from the system memory into a data scan register, and serially scanning out the data from the data scan register.

8. The method of claim 1, further comprising providing the first trigger signal in response to completion of the serial scanning into the control scan chain.

9. The method of claim 8, further comprising monitoring for the completion of the serial scanning into the control scan chain by the maintenance processing system, and providing the first trigger signal in response thereto.

10. A memory access system for facilitating dynamic access of memory by way of a maintenance processing system during standard operation of a computing system which utilizes the memory, comprising:
    a control register bank coupled to receive scanned address and control signals, wherein the control signals include at least a maintenance mode control signal indicative of a memory access operation via the maintenance processing system;

an access register bank;

a step multiplexer coupled to the control register bank to transfer the scanned address and control signals from the control register bank to the access register bank in response to completion of receipt of the scanned address and control signals; and a select multiplexer coupled to the access register bank to, in response to a clock trigger signal, select the scanned address and control signals as opposed to standard operational address and control signals produced by the computing system, wherein the scanned address and control signals specify data locations and access mode at the memory.

11. The memory access system as in claim 10, wherein the control register bank comprises a plurality of serially scannable registers coupled in series to receive the scanned address and control signals.

12. The memory access system as in claim 10, further comprising a data register coupled to receive data to be written from the maintenance processing system to the memory.

13. The memory access system as in claim 12, wherein the data register comprises a serially scannable data register coupled to the maintenance processing system to serially receive the data to be written.

14. The memory access system as in claim 12, wherein the step multiplexer is further coupled to the data register to transfer the data from the data register to the access register bank in response to completion of receipt of the scanned address, the control signals, and the data.

15. The memory access system as in claim 14, wherein the control signals comprise a write mode signal, and wherein the select multiplexer is coupled to the access register bank to further select the data originating from the maintenance processing system as opposed to data produced by the computing system, in response to the maintenance mode control signal and the write mode signal.

16. The memory access system as in claim 15, wherein the memory comprises a read/write control input to receive the write mode signal, and to store the data originating from the maintenance processing system in response to receipt of the write mode signal.

17. The memory access system as in claim 16, further comprising an address incrementor coupled to the access register bank to receive the scanned address and to increment the scanned address for each subsequent data block to be written to the memory.

18. The memory access system as in claim 10, wherein the scanned control signals comprise a read mode signal specifying a read memory mode as the access mode at the memory.

19. The memory access system as in claim 18, further comprising a data register coupled to receive data read from the memory.

20. The memory access system as in claim 19, further comprising an address incrementor coupled to the access register bank to receive the scanned address and to increment the scanned address for each subsequent data block to be read from the memory.

21. The memory access system as in claim 19, wherein the data register comprises a serially scannable data register coupled to the maintenance processing system to serially transfer the data to the maintenance processing system.

22. A system for dynamically accessing memory operating in a computing system, the system comprising:

a maintenance processing system having a processor configured to generate first and second trigger signals, and to generate serial scan data including at least one memory address of the memory and control signals including a maintenance mode control signal indicative of a memory access operation via the maintenance processing system; and a block mode wrapper coupled between the maintenance processing system and the memory, the block mode wrapper comprising:

a control register bank coupled to receive the serial scan data;

an access register bank;

a step multiplexer coupled to the control register bank to transfer the serial scan data from the control register bank to the access register bank in response to the first trigger signal; and a select multiplexer coupled to the access register bank to, in response to the maintenance mode control signal and the second trigger signal, select the memory address and control signals from the maintenance processing system as opposed to standard operational address and control signals produced by the computing system, wherein the scanned address and control signals specify data locations and access mode at the memory.

23. The system as in claim 22, wherein the processor of the maintenance processing system is configured to transmit the first trigger signal upon completion of scanning the serial scan data into the control register bank.

24. The system as in claim 22, further comprising a serially scannable data register coupled to receive data to be written from the maintenance processing system to the memory, and wherein the processor of the maintenance processing system is configured to transmit the first trigger signal upon completion of scanning both the serial scan data into the control register bank and the data into the serially scannable data register.

25. The system as in claim 22, further comprising a serially scannable data register coupled to receive data read from the memory.

26. The system as in claim 22, wherein the memory comprises one of a single-port memory or a multiple-port memory.

27. An apparatus for use in dynamically transferring data between a maintenance processing system and a system memory of a computing system during normal functional operation of the computing system, the apparatus comprising:

register means for dynamically receiving serial scan data including at least a memory access mode and a memory address;

an access register bank;

means for collectively stepping the memory access mode and the memory address from the register means to the access register bank in response to the serial scan data being received at the register means; and means for generating memory control input signals in response to a second trigger signal, and for initiating the dynamic transfer of the data between the memory and the maintenance processing system in response thereto.

* * * * *